United States Patent [19]
Allingham

[11] Patent Number: 5,889,972
[45] Date of Patent: Mar. 30, 1999

[54] BUS TO BUS BRIDGE DEADLOCK PREVENTION SYSTEM

[75] Inventor: Donald N. Allingham, Fort Collins, Colo.

[73] Assignee: Adaptec, Inc., Milpitas, Calif.

[21] Appl. No.: 823,958

[22] Filed: Mar. 25, 1997

[51] Int. Cl.$^6$ .............................. G06F 13/40; G06F 13/14
[52] U.S. Cl. ........................................... 395/308; 375/287
[58] Field of Search .................................... 395/280, 281, 395/284, 287, 306, 308, 309, 310

[56] References Cited

U.S. PATENT DOCUMENTS

| | | | |
|---|---|---|---|
| 5,542,056 | 7/1996 | Jaffa et al. | 395/306 |
| 5,625,779 | 4/1997 | Soloman et al. | 395/293 |
| 5,632,021 | 5/1997 | Jennings et al. | 395/309 |

OTHER PUBLICATIONS

Digital Semiconductor 21052 PCI–to–PCI Bridge Data Sheet, Digital Equipment Corporation, pp. iii–A–2, Jan. 1996.

PCI Local Bus Specification Rev. 2.1; Jun. 1, 1995, pp. 32, 41, 43, 44, 115, and 116.

*Primary Examiner*—Ayaz R. Scheikh
*Assistant Examiner*—Jigar Pancholi
*Attorney, Agent, or Firm*—Duft, Graziano & Forest, P.C.

[57] ABSTRACT

A bus to bus bridge deadlock prevention system detects and resolves a deadlock condition in a bus to bus bridge. In a PCI protocol application of the present invention, the system detects a retry of a request by a master device. The request is masked for a delay period before the request is allowed to attempt to pass through a PCI to PCI bridge. If the request results in a further retry, the delay period length is changed and the request is masked for the different delay period. Successive retry requests are masked for different delay periods until the deadlock condition is resolved. The system adapts to the deadlock condition by repeatedly changing the delay period until the deadlock condition is resolved and the bridged busses resume normal operation.

10 Claims, 4 Drawing Sheets

BUS TO BUS BRIDGE DEADLOCK PREVENTION SYSTEM

FIELD OF THE INVENTION

The present invention relates to the field of bus to bus bridges used to transfer data between two or more busses. More particularly the present invention relates to a system for preventing deadlock in a bus to bus bridge between data busses. Still more particularly the present invention relates to a system for preventing deadlock in a bus to bus bridge between data busses. Still more particularly the present invention relates to a system for preventing deadlock in a PCI to PCI bridge.

STATEMENT OF THE PROBLEM

Data busses form the skeleton of modern computer systems. A computer has, for example, a memory bus over which data is transferred from a data storage unit to a Central Processing Unit ("CPU") and vice versa. An Input output ("I/O") bus connects various devices such as, for example, an external tape drive to a computer system allowing the exchange of data between the CPU and the tape drive. Whenever one bus communicates data to and from a second bus, a device known as a bridge is used to control communications between the two busses.

A variety of bridges are used in the design of computer systems. There are bridges used to connect a CPU to a data bus. There are bridges used to connect one type of data bus to a different type of data bus. There are also bridges used to connect a data bus to a like-data bus. Like-bus to like-bus bridges are typically used to expand the number of devices that can be attached to a single bus. For example, a Peripheral Communications Interface ("PCI") bus is limited to a total of 10 loads that can be connected to the bus. Each device connected to a PCI bus can represent one or more loads. To expand the number of devices that can be connected to a primary PCI bus, a PCI to PCI Bridge is used to connect a secondary PCI bus to the primary PCI bus. A PCI to PCI Bridge appears as a single load on the primary and secondary PCI busses and provides access to a secondary PCI bus which is also capable of supporting 10 loads. Another set of loads can be connected to the secondary bus thereby expanding the total number of devices connected to the computer system's PCI bus. The PCI to PCI Bridge controls the communications between the primary PCI bus and the secondary PCI bus. Multiple PCI to PCI bridges can be used to further expand the PCI bus beyond a primary and a secondary PCI bus.

According to the PCI bus protocol a master device issues a request over the PCI bus to a target device identified in the issued request. The identified target device recognizes its device identification and accepts the request. Once this initial handshake is complete, the master device and target device conduct whatever operation is identified by the request. This is the basic mechanism by which two devices connected to a PCI bus communicate with one another. This is often referred to as a transaction.

When a PCI to PCI Bridge is used to connect a primary bus to a secondary bus, the PCI to PCI Bridge acts as both a target and a master when a master device on one bus issues a request to a target device on another bus. For example, a master device on the primary PCI bus of a computer system needs to write data to a target device on the system's secondary PCI bus. The master device issues a request on the primary PCI bus which identifies the target device on the secondary bus. The PCI to PCI Bridge, acting as a target device, accepts the request from the master device off the primary PCI bus. The PCI to PCI Bridge, acting as a master device, then, issues the request to the target device on the secondary PCI bus. The target device then accepts the request on the secondary PCI bus.

A problem occurs when a request issued by a master device on one bus conflicts with a request issued by a master device on another bus. For example, when a master device on the primary bus issues a request to a target device on the secondary bus the PCI to PCI Bridge cannot pass the request from the primary bus to the secondary bus if the secondary bus is unavailable. The secondary bus might be unavailable because it is currently owned by another device and is therefore busy. In this situation the PCI to PCI Bridge issues a "retry" to the master device on the primary bus. A retry, which is actually a logical combination of various PCI bus signals, indicates to the master device that the request must be retried. The primary bus master device then attempts to issue the request for a second time. Typically a request is successfully completed on the first retry because the activity that was tying up the secondary bus and making the PCI to PCI Bridge unable to pass the request to the secondary bus has been completed. The same retry situation can occur in the other direction, i.e. a master device on the secondary bus issues a request to a target device on the primary bus but the request cannot be passed to the primary bus by the PCI to PCI Bridge due to the unavailability of the primary bus or the unavailability of the target device. A retry is issued by the PCI to PCI Bridge to the master device on the secondary bus.

If master devices on the primary bus and the secondary bus issue requests to target devices on the other busses at the time, neither request can by passed by the PCI to PCI Bridge because the primary and secondary buses are both busy issuing their respective requests. If the timing of requests issued by master devices on both busses is such that the retry condition happens at the same time on both busses and both master devices issue their respective retry requests at the same time, the PCI to PCI Bridge becomes deadlocked. Basically, the master device on the primary bus and the master device on the secondary bus end up issuing their respective retry requests with the same cycle relationships, i.e. at the same time, thereby causing the two bridged busses to be deadlocked and inoperative.

Digital Equipment Corporation ("DEC") offers a partial solution to this problem in its PCI 2.0 compliant PCI to PCI Bridges (DEC product No. 21052). The DEC product uses a fixed delay time during which a request from one master device is masked giving time for a request from another master device to succeed. The objective is that one master device's request is held off the bus long enough to change the cycle relationships between the requests on the two busses to allow one of the requests to succeed. Once one of the requests succeeds then the other request may proceed since the other bus is no longer busy. This works most of the time but, since the delay time is fixed, situations still arise where the same deadlock problem occurs. For example, it can occur that the DEC PCI to PCI Bridge encounters a deadlock condition and applies its fixed delay time to requests from one of the busses. Unfortunately, the cycle relationships between the two busses resulting from application of the request mask still leaves the bus in a deadlock condition. The DEC PCI to PCI Bridge is incapable of adapting to this recurring deadlock problem.

There exists a need for a bus to bus bridge that senses the occurrence of a deadlock condition, holds requests from one of the busses off the bus for a number of cycles to break the deadlock condition and adapts the number of cycles in the event the deadlock condition is not resolved.

STATEMENT OF THE SOLUTION

The above-described problems and others are solved and an advance in the art is thereby achieved by the bus to bus bridge deadlock prevention system of the present invention. The system of the present invention uses an adaptive request mask timer to prevent deadlock from occurring between bridged data busses. The system recognizes a deadlock condition and applies a request mask to delay requests from one bus thereby allowing other requests from another bus to be processed successfully. The adaptive request mask timer modifies the length of the request mask delay until the deadlock condition is broken and the bridged busses are able to continue normal operation.

A deadlock condition occurs when at least one device on a first bus and at least one device on a second bus issue requests that must pass through a bus to bus bridge and both devices must retry their requests. Most deadlocks are resolved without intervention because the different devices issue their respective retry requests with different cycle relationships. Hence one of the requests succeeds on the first retry and thereafter the other request succeeds. However, if the retry requests from both busses have similar cycle relationships, i.e. similar timing, a deadlock condition occurs.

The system of the present invention senses when a deadlock condition occurs. The system then applies a request mask to requests from one of the two busses effectively holding those requests of the bus for a period of time. During the time that requests from one bus are masked, requests from the other bus are able to successfully complete. In the event that the deadlock condition is not resolved after a first request mask is applied, the request mask timer adapts the request mask delay. Requests from one bus are thereby held off the bus for a different length of time. The request mask timer repeatedly adapts to produce different request mask delay periods. Eventually the cycle relationships between the two busses are sufficiently changed and the deadlock condition is resolved.

In a preferred embodiment of the present invention, the bus to bus bridge deadlock prevention system of the present invention is applied to a PCI to PCI Bridge between two PCI busses.

The system of the present invention senses when a retry is issued to a master device attempting to issue a request through a PCI to PCI Bridge. On the initial retry request by the master device there is no delay imposed. If, however, a second retry request by the master device is necessary because the deadlock condition still exists, the system of the present invention operates to mask the master device's request for a period of time to give an opportunity for other requests to be successfully completed. With each successive retry request, the request mask delay time is changed to continue to attempt to break the deadlock situation. The request mask delay is enabled only when necessary and then operates to adapt the delay time until the deadlock condition is resolved.

In a preferred embodiment of the present invention, a sequencer generates a delay count. The delay count is expressed in terms of a number of cycles. A cycle is a bus system clock cycle. The delay count generated by the sequencer is stored in an initial delay register. Each time a retry is sensed by the present invention, the current value stored in the initial delay register is loaded to a down counter and a new delay count is loaded from the sequencer to the initial delay register. The down counter output is used to mask the relevant retry request until the down counter counts to zero. When the down counter outputs a zero value, the master's request is allowed to attempt to pass through the PCI to PCI Bridge. If the deadlock condition is not thereby resolved, a new delay count is loaded from the initial delay register to the down counter and the relevant request is masked for a different length of time. Once a request is successfully processed, the initial delay register contents are reset to an initial value. In one embodiment of the present invention the delay register is initialized to zero. Therefore, there is no delay mask applied to an initial retry request but subsequent retry requests will be masked since a new, non-zero delay value is loaded from the sequencer to the delay register with each retry.

DETAILED DESCRIPTION

Figure 1:
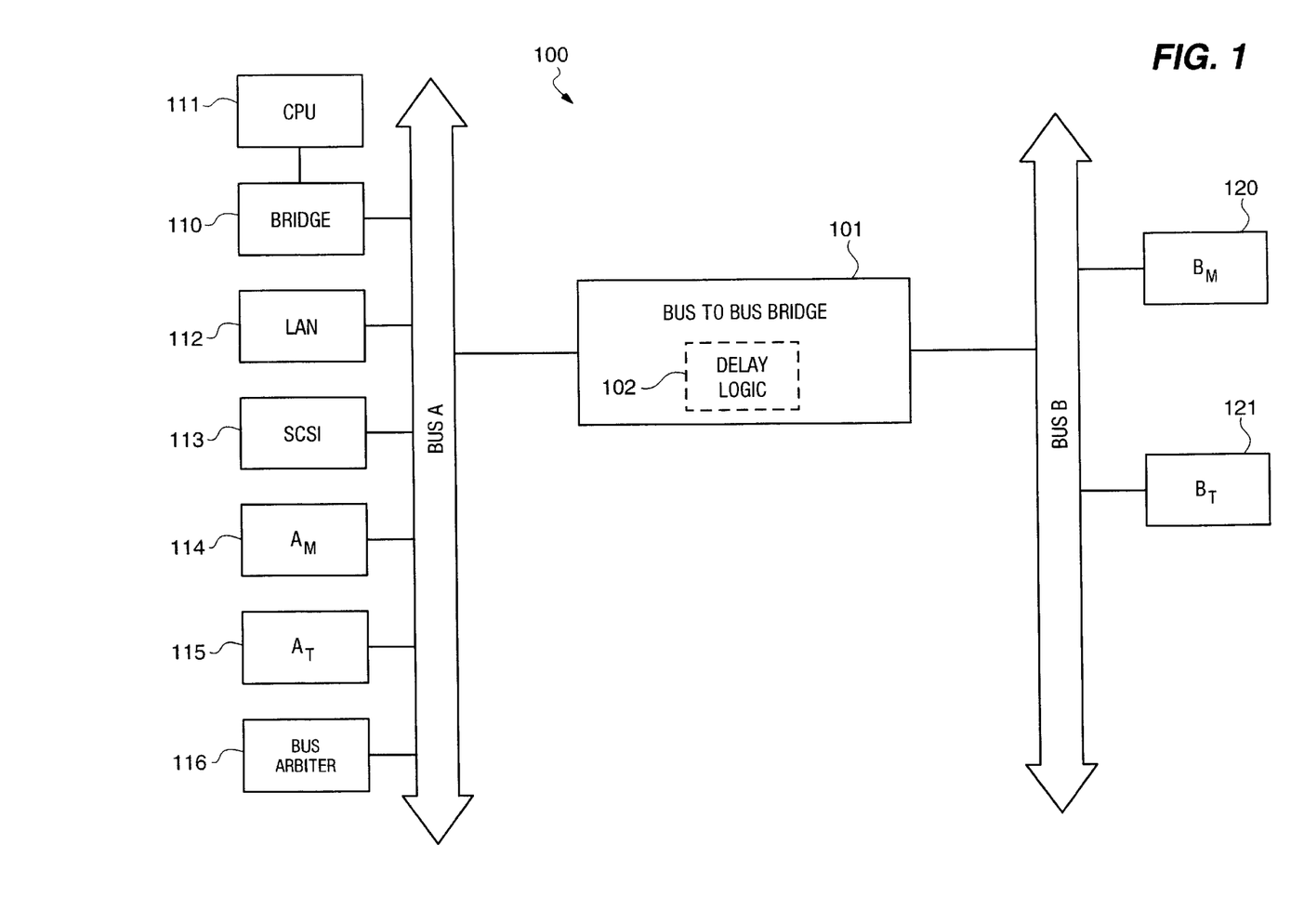
FIG. 1 depicts a block diagram showing two bridged data busses.

Bus to Bus Bridge In General—FIG. 1

Data bus system 100 of FIG. 1 includes Bus A and Bus B which are connected by bus to bus bridge 101. Communications between devices connected to Bus A and devices connected to Bus B occur through bus to bus bridge 101. Bus A and Bus B operate according to any standard data communications protocol(s). Bus system 100 is representative of a bus system within a computer (not shown). CPU 111 of the computer is connected to Bus A through bridge 110. Various other devices may also be connected to Bus A including, but not limited to, Local Area Network ("LAN") 112, Small Computer System Interface ("SCSI") device 131 bus arbiter 116 and devices $A_m$ and $A_r$. Bus arbiter 116 is a device configured to control the access to Bus A by the devices connected to Bus A. Typically, bus arbiter 116 is formed as part of the chip set comprised by CPU 111 and bridge 110. Devices 114 and 115 are connected to Bus A and referred to as devices $A_M$ and $A_T$ in the following discussion. Devices $A_m$ and $A_t$ are used in the examples below and are devices of any type that are compatible with the bus protocol used over Bus A. Connected to Bus B are devices 120 and 121 which are referred to as devices $B_m$ and $B_r$. Devices $B_m$ and $B_T$ are used in the examples below and are devices of any type that are compatible with the bus protocol used over Bus B.

Bus to bus bridge 101 is comprised of logic that controls communications between devices connected to Bus A and devices connected to Bus B. In the case where Bus A and Bus B are of different types, bus to bus bridge 101 also provides logic for converting bus messages from the protocol of Bus A to bus messages of the protocol of Bus B and vice versa.

The general operation of bus to bus bridge 101 is described with respect to the following example. Device $A_M$ on Bus A is a master device which needs to store data to target device $B_T$ on Bus B. Device $A_M$ issues a request over Bus A to device $B_r$. The nature of a request depends on the specific bus protocol but generally speaking a request includes an address phase and a data phase. During the address phase, the master device and the target device establish communications. During the data phase, data is transferred, as appropriate for the particular command, between the master device and the target device. In the example of FIG. 1, devices $A_M$ and $B_T$ are on different busses and therefore must communicate through bus to bus bridge 101 rather than communicating directly. Bus to bus bridge 101, acting as a target device, accepts device $A_M$'s request over Bus A. Bus to bus bridge 101, acting as a master device, then issues $A_M$'s request over Bus B. Device $B_T$ accepts the request over Bus B. Device $B_T$ receives a data stream, according to the specific request of device $A_M$, from device $A_M$. Device Am's request is thereby successfully completed.

In the above example, Bus B was available to bus to bus bridge 101 so that bus to bus bridge 101 could immediately pass the request from Bus A to Bus B. If in the above example, Bus B was busy and unavailable when bus to bus bridge 101 attempted to issue $A_m$'s request to device $B_t$, then bus to bus bridge 101 would issue a retry signal to device $A_m$. In response, device $A_m$ waits its turn to get control of Bus A again, according to the arbitration system imposed by arbiter 116, and then retries the same request. A deadlock situation can occur when, for example, master device $A_m$ issues a request to target device $B_t$ and master device $B_m$ issues a request to target device $A_t$. If the two requests on the two bridged busses have similar timing, i.e. similar cycle relationships, then neither request can be passed to the other bus because both busses are busy with their respective request signal. Thus, bus to bus bridge 101 issues a retry to master device $A_m$ because Bus B is unavailable due to master device $B_m$'s request. Bus to bus bridge 101 also issues a retry to master device $B_m$ because Bus A is unavailable due to master device $A_m$'s request. If master device $A_m$ and master device $B_m$ both retry their respective requests with the same timing then both requests will again be blocked since both busses are again busy issuing requests. This deadlock condition results because of the similar cycle relationships of the retry-request loops on the respective busses. Hence, both Busses A and B are rendered inoperable since they remain constantly busy and unavailable for use.

A retry can be issued by any device and a deadlock situation can occur through more than one series of events. For example, in the above series of events, master device $A_m$ and target device $A_t$ may be the same physical device. Under these conditions device $A_t$ may issue a retry to device $B_m$'s request because device A (the combined $A_m$ and $A_t$) is waiting for the request from $A_m$ to $B_t$ to successfully complete before accepting a request from device $B_m$.

The bus to bus bridge deadlock prevention system of the present invention prevents the deadlock situation from occurring. Delay logic 102 operates to delay the timing of requests on either Bus A or Bus B thereby preventing the delayed bus from returning with a retry request having the same timing as the non-delayed bus. The delay of a requests from one bus is referred to as a request mask or request mask delay. Delay logic 102 adapts the request mask delay until the deadlock condition is resolved. Thus, if after a first request mask is applied to a retry request the deadlock condition still occurs, delay logic 102 changes the delay time with subsequent retries until the deadlock condition is resolved.

Figure 5:
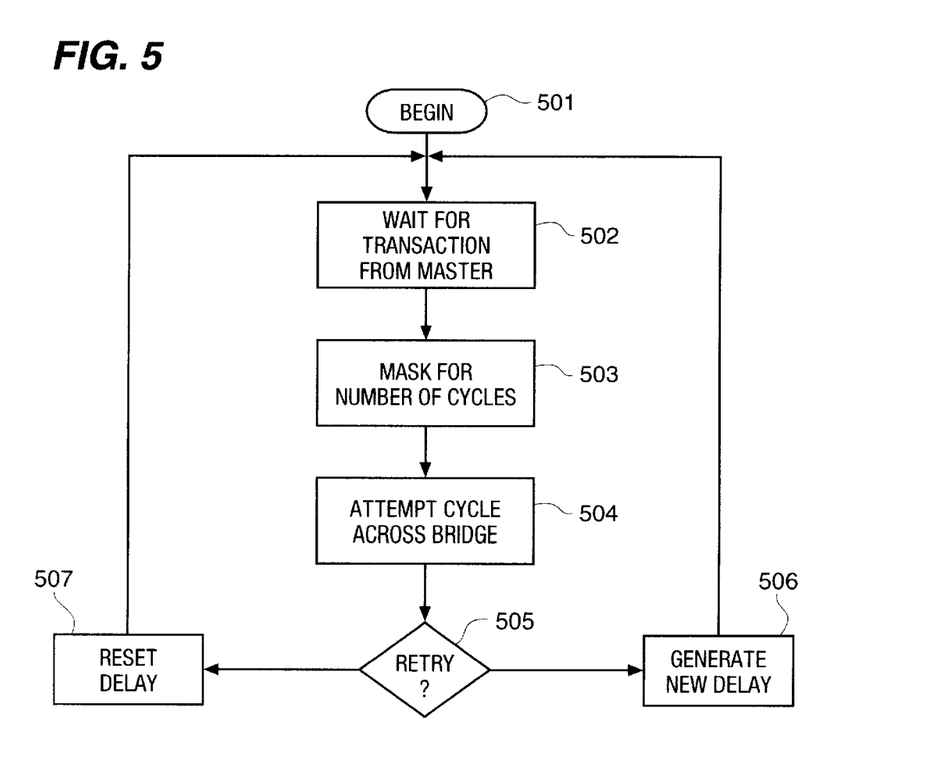
FIG. 5 is a flow chart illustrating the general operation of the system of the present invention.

Deadlock Prevention System In General—FIG. 5

FIG. 5 is a flow chart depicting the general process by which the deadlock prevention system of the present invention operates. In the following description of FIG. 5, the bus whose requests are masked in the event of a deadlock condition is referred to as the secondary bus. The bus on the other side of the bus to bus bridge from the secondary bus is referred to as the primary bus. The system begins with step 501 which is representative of the initialization of the computer system within which bus system 100 operates. Upon initialization of the computer system, processing continues to step 502. During step 502, the deadlock prevention system of the present invention waits for a request from the master device on the secondary bus. With each transaction or attempted transaction over the bus, processing continues to decision block 503.

During step 503, the request from the master device on the secondary bus is masked by the system of the present invention for a number of cycles equal to a delay count. In a preferred embodiment of the present invention, the delay count is initialized to zero. Once the request has been masked for a number of cycles equal to the delay count, processing proceeds to step 504.

During step 504, the bus to bus bridge allows the request to be attempted across the bus to bus bridge. During step 505, it is determined whether the request which was attempted during step 504 was successfully completed or whether it generated a responsive retry. If the request was successfully completed, then processing continues to step 507 else processing continues to step 506.

During step 506, a new delay count is generated. The delay count is the number of cycles a request will be masked before it is allowed to attempt to pass from the secondary bus to the primary bus across the bus to bus bridge. Processing then returns to step 502. The series of steps 502–506 repeat with a different delay count used each time to mask the successive requests until the request is successfully completed, i.e, no retry. When the request is successful, the delay count is reset by operation of step 507.

As noted, in a preferred embodiment of the present invention the initial delay count is zero. Thus, the system of the present invention does not delay a request until a retry is detected thereby preserving bus cycle time until the request mask is needed to avoid a deadlock situation.

The system of the present invention, described generally with respect to processing steps 501–507, operates to apply an adaptive delay mask to successive requests on a secondary bus until the request is successfully completed.

Figure 2:
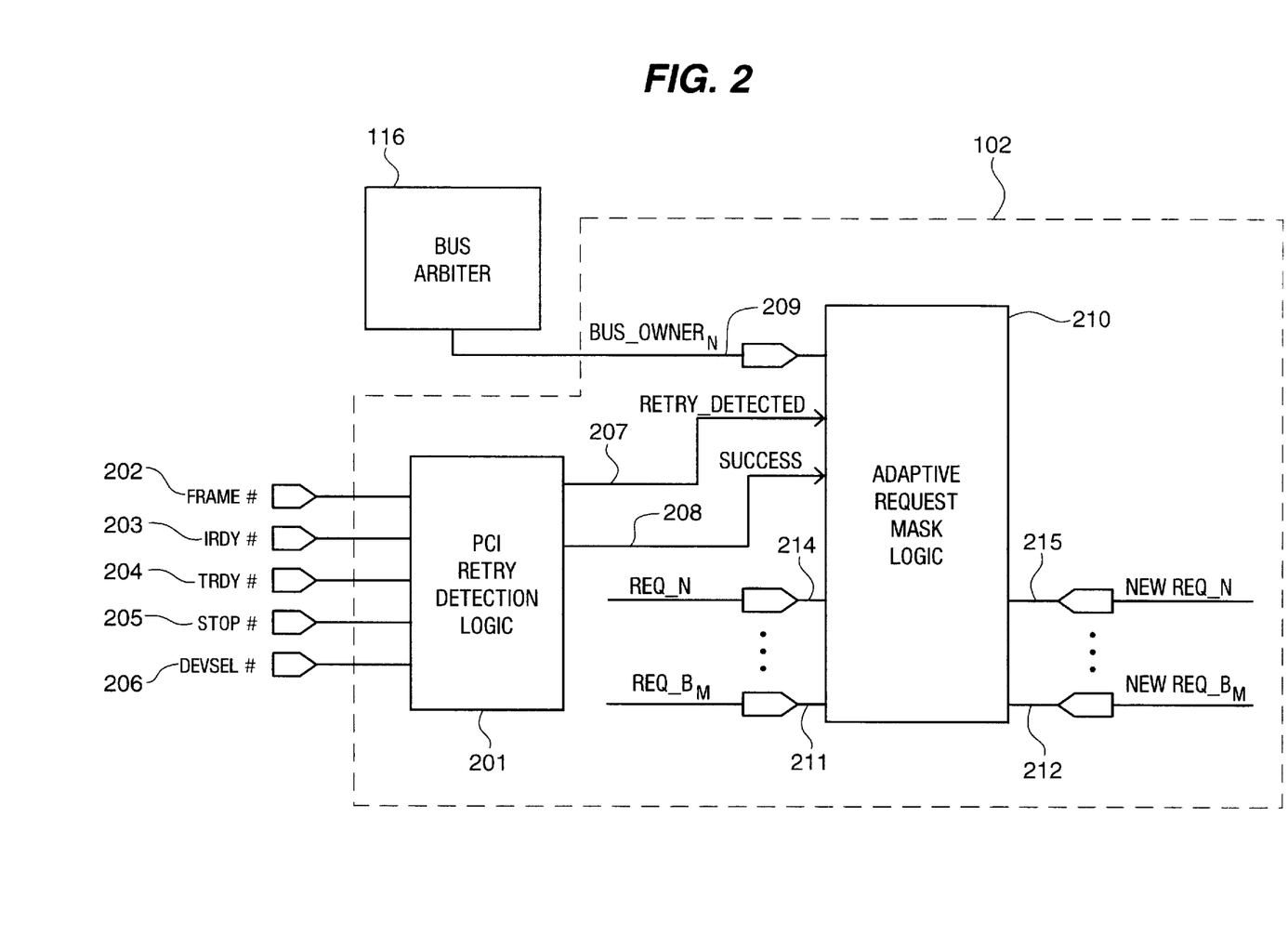
FIG. 2 depicts a block diagram of a PCI to PCI bridge implementation of the present invention.
Figure 3:
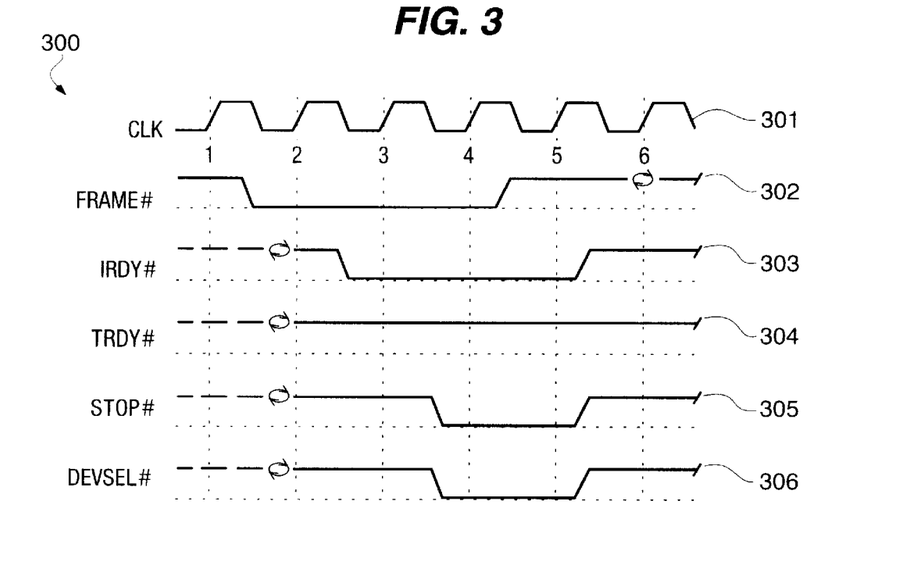
FIG. 3 is a timing diagram depicting the conditions under which a retry occurs.

Delay Logic—FIGS. 1–3

FIG. 2 is a block diagram illustrating delay logic 102 in further detail. Delay logic 102 implements the general processing steps discussed with respect to FIG. 5. FIG. 2 is described with respect to an exemplary case where Bus A and Bus B, with reference to FIG. 1, are both PCI busses and bus to bus bridge 101 is a PCI to PCI bridge. Delay logic 102 is configured in this example to delay, if necessary, requests on Bus B for devices on Bus A in order to resolve a deadlock situation. Delay logic 102 includes PCI Retry Detection Logic ("PRDL") 201 and Adaptive Request Mask Logic ("ARML") 210. PRDL 201 operates to detect when bus to bus bridge 101 issues a retry to a master device. Those skilled in the art recognize that a PCI to PCI bridge does not literally issue a retry signal. Rather, a combination of PCI bus signals, described below with respect to FIG. 3, are recognized by a master device who currently owns the bus as being a retry signal indicating that the master device must retry its request. Bus signals 202–206 from Bus B are received by PRDL 201. PRDL 201 examines the PCI Bus B, through bus signals 202–206, looking for either a successful operation or a retried operation. PRDL 201 asserts the Retry_Detect signal over line 207 when a retried operation is seen and PRDL 201 asserts the Success signal over line 208 when a successful operation has been seen. A successful operation is a transaction between two devices that has been completed.

FIG. 3 is a timing diagram 300 showing a PCI transaction that is terminated with a retry indication to the requesting master device. The signal protocol of a PCI bus is well-known to those skilled in the art. The description of FIG. 3 is intended only to illustrate the conditions under which PRDL 201 asserts a Retry_Detect signal. Timing diagram 300 includes signals 301–306. Signals 301–306 are signals communicated over a PCI bus. Signal 301 is the clock signal from a bus system clock (not shown). PCI bus signals are sampled on the rising edge of the clock signal. The bus transaction of FIG. 3 starts with FRAME#202 and IRDY#205 (initiator ready) being asserted by a master device such as device $B_m$ of FIG. 1. Prior to the transaction of FIG. 3, device $B_m$ has already been given control of Bus B by the bus arbiter. Time-line 302 represents the assertion of the FRAME#204 signal at clock cycle 2 and time-line 303 represents the assertion of the IRDY#203 signal at clock cycle 3. A target device claims the transaction of FIG. 3 by asserting DEVSEL#206 (device select) on clock 4. In this example the ultimate target device is a device $A_t$ on Bus A. However, the transaction must occur through bus to bus bridge 101 thus bus to bus bridge 101 is the actual target device for this transaction. Time-line 306 represents the assertion of DEVSEL#206 at clock cycle 4. The target device also determines that it cannot complete the master device's request and therefore asserts STOP#205 and keeps TRDY#204 (target ready) de-asserted on clock cycle 4. Time-line 304 represents the de-assertion of TRDY#205 and time-line 305 represents the assertion of STOP# at clock cycle 4. This occurs because Bus A is busy and therefore not available to accept the request of master device $B_m$ from bus to bus bridge 101 or because the target on bus A issued a retry to the bridge when the bridge attempted to issue the request on bus A. Based on this combination of signals, the master device $B_m$ knows the target device is unable to transfer any data for this transaction. Consequently the master device $B_m$ knows that it must retry its request.

It is the combination of a target device claiming a transaction by asserting DEVSEL#206 but also asserting STOP#205 and keeping TRDY#204 de-asserted that is sensed by PRDL 201. When this bus condition is sensed, PRDL 201 asserts the Retrydetect signal over path 207. Otherwise PRDL asserts the Success signal over path 208. It is apparent to those skilled in the art that the above-described combination of signals can be noted by numerous various logical implementations within PRDL 201. The specific implementation of PRDL 201 does not form part of the present invention.

The request signals 211–214 from master devices on Bus B pass through ARML 210 to Bus A. ARML 210 also receives the RETRY DETECTED signal over path 207 and the SUCCESS signal over path 208. ARML 210 also receives the BUS_OWNER signal over path 209 from bus arbiter 116.

Bus arbiter 116 implements the arbitration scheme for system 100. According to the PCI protocol, each master device on a PCI bus must arbitrate for each transaction it requests on the bus. Each master device connected to a PCI bus has a unique request signal (REQ#) and a unique grant signal (GNT#). There is a unique REQ/GNT pair for each master device on a PCI bus. A master device gains access to the bus by issuing its request signal. When the bus arbiter determines that it is the master device's turn to control the bus, the bus arbiter issues the master device's unique grant signal. When the bus is next available the master device becomes the bus owner and initiates a new transaction. The arbitration process occurs during the previous bus transaction so that no bus time is wasted. The Bus_Owner signal over line 209 from bus arbiter 116 indicates which master device is the current bus owner.

ARML 210 utilizes the Bus_Owner, Retry_Detect and Success signals to control application of a request mask to request signals 211–214. In the current example, the request signals 211–214 from Bus B are monitored by ARML 210. ARML 210 determines whether to apply, and applies as appropriate, a delay to one of request signals 211–14 from Bus B. Request signal REQ_$B_m$ on line 211 is the unique request signal of master device $B_m$ on Bus B. Those skilled in the art recognize that bus signals are not communicated over separate physical lines or wires. Reference numerals used herein and associated bus signals or "lines" are provided for the sake of clarity. If ARML 210 determines that no delay, i.e, no request mask, is necessary then ARML 210 outputs the request signal REQ_$B_m$ over output 212 as request signal NEWREQ_$B_m$ with the same timing as the original request signal REQ_$B_m$. If ARML 210 determines that a delay is necessary in order to break a deadlock situation, then ARML 210 outputs the request signal REQ_$B_m$ over output 212 as request signal NEWREQ_$B_m$ but with a timing delay as compared to the original request signal REQ_$B_m$. The request signal REQ_N over line 214 and the corresponding NEWREQ_N signal at output 215 represent any number of additional request signals for master devices connected to Bus B. As noted above, each master device has a unique REQ/GNT signal pair with which it is associated. The request signals monitored by ARML 210 are collectively referred to as request signals 216.

The Bus_Owner$_N$ signal is used to qualify the Retrydetect signal and the Success signal to ensure that ARML 210 only responds to a Retrydetect signal if the Retrydetect signal corresponds to one of request signals 211–214. Therefore if a Retrydetect signal is asserted due to a retried request from a master device not corresponding to one of request signals 216, then ARML 210 has no affect on any request signals 216. There is 1 Bus_Owner signal for each REQ/GNT pair.

Figure 4:
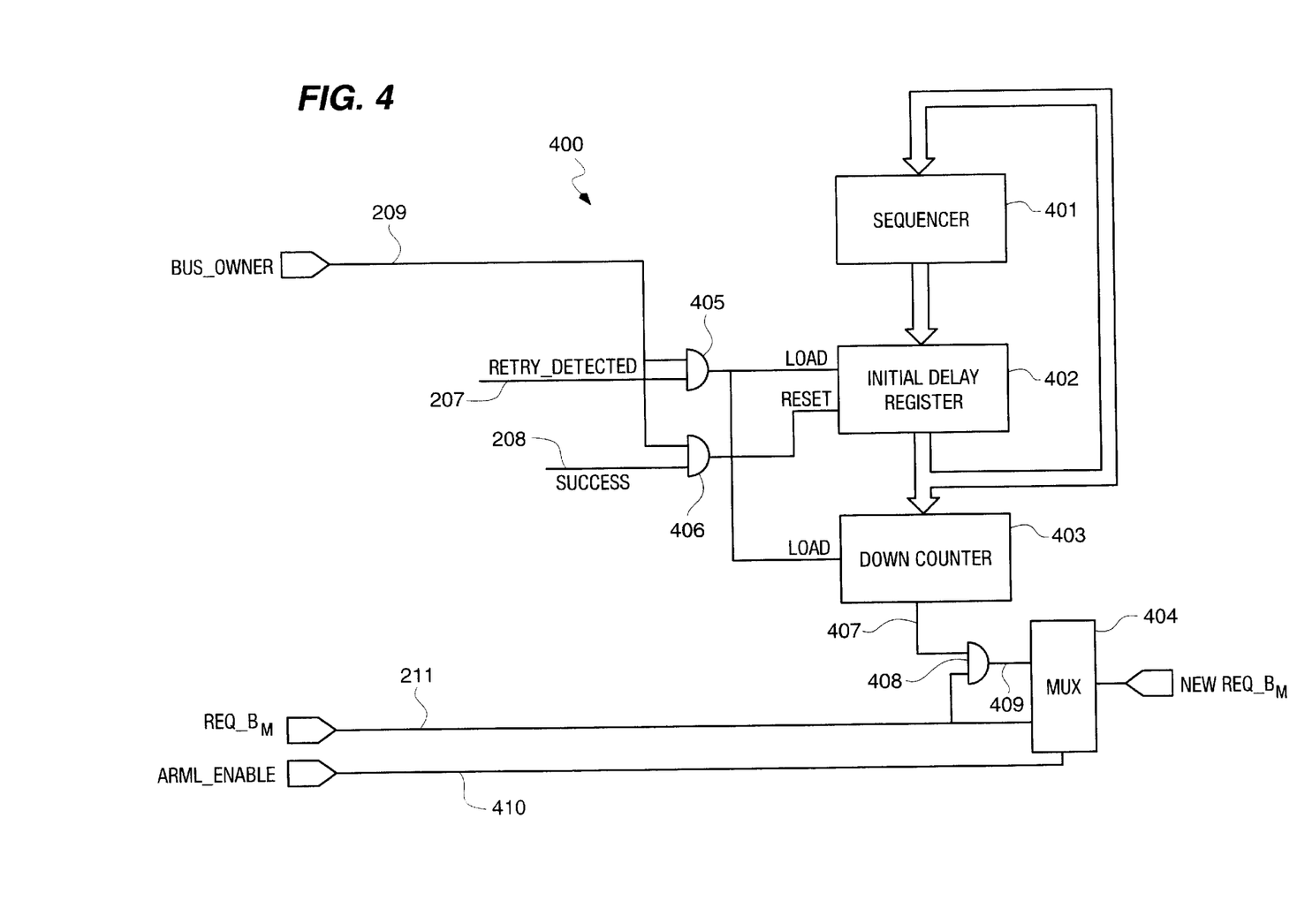
FIG. 4 depicts a block diagram showing further detail of a PCI to PCI bridge implementation of the present invention.

FIG. 4 depicts the logic of ARML 210 in greater detail. Circuit 400 is replicated within ARML 210 for each one of request signals 216. Thus there are N circuits 400, each one dedicated to a single unique REQ/GNT pair. The exemplary circuit 400 of FIG. 4 represents the one circuit 400 of ARML 210 dedicated to the request signal REQ_$B_m$ over line 211. As noted, request signal REQ_$B_m$ is the request signal associated with master device $B_m$ on Bus B. Circuit 400 and the other circuit 400's (not shown) associated with other REQ/GNT pairs receive as control inputs, the Retry-Detected signal over line 207 and the Success signal over line 208. The ARML_Enable signal is used to enable ARML 201. When ARML_Enable is asserted the deadlock prevention system of the present invention is enabled.

Initial delay register ("IRD") 402 stores the number of clock cycles that request signal REQ_$B_m$ is to be masked in the event that request signal REQ_$B_m$ is a retry request. Sequencer 401 generates the next value to be loaded into IRD 402. AND gate 405 operates to assert the LOAD signal to IRD 402 and down counter 403 each time the Retrydetect signal is asserted when the Bus_Owner signal indicates that master device $B_m$ is the bus owner. When the LOAD signal is asserted to IRD 402, the count currently stored in IRD 402 is loaded into down counter 403 as the delay count value. At the same time the next count value is loaded from sequencer 401 into IRD 402.

Down counter 403 increments down with each cycle from the delay count value to zero and outputs its present value over line 407 to gate 408. Gate 408, producing an output on line 409 to multiplexer 404, operates to qualify the REQ_$B_m$ signal with the value output from down counter 403. The input to multiplexer 404 on line 409 is passed to output NEWREQ_$B_m$ so long as ARML_Enable is asserted. Thus the output of gate 408, and consequently output signal NEWREQ_$B_m$, is zero so long as the output of down counter 403 is a nonzero value. When down counter 403 counts down to zero the output of gate 408 over line 409 to multiplexer 404 is the REQ_$B_m$ signal. The REQ_$B_m$ signal, delayed by the delay count, is then output by multiplexer 404 as NEWREQ_$B_m$. Multiplexer 404 is used to enable or disable circuit 400. One skilled in the art recognizes that multiplexer 404 could alternatively be removed from circuit 400 and circuit 400 could be configured to be permanently enabled.

When a first or a subsequent delay of the REQ_$B_m$ signal is effective at breaking the deadlock then the Success signal is asserted over line 208. When a first or subsequent delay of the REQ_$B_m$ signal is not effective at breaking the deadlock then the Retrydetect signal is again asserted over line 207. Each successive time the Retrydetect signal is asserted with respect to the REQ_B_m signal, the current value stored in IRD 402 is loaded to down counter 403 as the delay count value and a new delay value is loaded into IRD 402 from sequencer 401. This process continues with each successive, relevant retry request until the deadlock condition is resolved. When the deadlock condition is resolved the REQ_$B_m$ signal will initiate a successfully completed transaction. A successfully completed transaction will result in the assertion of the Success signal over line 208. Assertion of the Success signal in combination with a BUS_Owner signal indicating master device $B_m$ results, through operation of AND gate 406, to assert the Reset signal to IRD 402. When the RESET signal is asserted to IRD 402, an initial value is loaded into IRD 402.

In a preferred embodiment of the present invention, the initial value loaded into IRD 402 upon a reset is zero. On a first occurrence of a Retrydetect signal, the initial delay count loaded from IRD 402 to down counter 403 is therefore zero. Thus there is no delay applied to the REQ_$B_m$ signal for a first retried request. Typically the deadlock situation is resolved on the first retry and therefore the request mask of the present invention is not applied to the request unless it is necessary. This avoids wasting any cycles on the bus. If the deadlock is not resolved on the first retry, according to the preferred embodiment, the values loaded from sequencer 401 to IRD 402 increment by 8 with each successive retry. Those skilled in art recognize that the values generated by sequencer 401 do not need to increment in this fashion. Any kind of number generator could be used in place of the preferred approach described herein.

SUMMARY

The system of the present invention uses an adaptive request mask timer to prevent deadlock from occurring between bridged data busses. The system recognizes a deadlock condition and applies a request mask to delay requests from one bus thereby allowing other requests from another bus to be processed successfully. The adaptive request mask timer modifies the length of the request mask delay until the deadlock condition is broken and the bridged busses are able to continue normal operation.

Although specific embodiments of the present invention are disclosed herein, it is expected that persons skilled in the art can and will design alternative bus to bus bridge deadlock prevention systems that are within the scope of the following claims either literally or under the doctrine of equivalents. Although specific embodiments are disclosed herein with respect to application of the present invention to a PCI to PCI bridge, those skilled in the art recognize that the same principles are equally applicable to other combinations of like-bus to like-bus bridges and bus to bus bridges where the two busses operate according to different protocols.

I claim:

1. A bridge deadlock prevention apparatus for a bus to bus bridge that transfers data between a first device connected to a first data bus and a second device connected to a second data bus wherein a retry signal is generated by said bus to bus bridge and is transmitted to said first device to delay a request for a data transfer when said data transfer cannot be completed, said apparatus comprising: retry detection means for receiving said retry signal;

a loader means for storing a delay time for said request;

counter means for receiving said delay time from said loader means and for determining whether said delay time has expired;

request masking means for preventing said request for said data transfer of said first device from being transmitted responsive to a determination by said counter means that said delay time has expired;

a retry success means for determining whether a delayed request for said data transfer has been completed responsive to a determination that said delay time has expired;

a sequencer means for generating a new delay time and loading said new delay time into said loader means responsive to a determination said delayed request cannot be completed; and said counter means being effective to receive said new delay time to cause a subsequent delay of said request for said new delay time.

2. The bridge deadlock prevention apparatus of claim 1 wherein aid first data bus is operating according to the PCI protocol and said second bus is operating according to the PCI protocol.

3. The bridge deadlock prevention apparatus of claim 1 wherein said retry success means includes:

successful transaction detection means for issuing a success signal when said first device is able to complete said delayed request for a data transfer to said second device.

4. The bridge deadlock prevention apparatus of claim 3 wherein said retry success means comprises:

means for receiving said success signal; and means for resetting said loader means with said delay time responsive to a reception of said success signal.

5. The bridge deadlock prevention apparatus of claim 1 further comprising:

confirming means for confirming that said retry signal corresponds to said request from said master device responsive to said retry detection means receiving said retry signal.

6. The bridge deadlock prevention apparatus of claim 1 wherein said counter means being effective to decrement said delay time and to output a zero signal when said delay time is decremented to zero.

7. The bridge deadlock prevention apparatus of claim 6 further comprising:

means for receiving a success signal from said bus to bus bridge indicating a request for a data transfer can be completed;

means responsive to a reception of said success signal for transmitting said request over said second bus.

8. The bridge deadlock prevention method of claim 1 further comprising the steps of:

determining whether said request is successfully completed; and resetting said delay value responsive to a determination said request is successfully completed.

9. A bridge deadlock prevention method for a bus to bus bridge wherein data is transferred between a first data bus and a second data bus through said bridge, said method comprising the steps:

waiting for a request from a master device connected to said second bus to a target device connected to said first data bus;

1. masking said request for a number of cycles equal to a delay value;
   2. allowing said request to attempt to pass over said bus to bus bridge, responsive to completion of said masking step, from said second bus to said first bus.
   3. determining whether said request from said master device to said target device must be retried;
   4. generating a new delay value in response to a determination that said request must be retried wherein said new delay value is different from said delay value;
   5. substituting said new delay value for said delay value; and
   6. repeating steps 1–5 responsive to a determination that said request must be retried.

10. The method of claim 9 wherein said first data bus is a primary bus operating according to the PCI protocol and said second bus is a secondary bus operating according to the PCI protocol.

\* \* \* \* \*